(12) United States Patent
Moreton et al.

(10) Patent No.: US 9,759,092 B2
(45) Date of Patent: Sep. 12, 2017

(54) CASING COOLING DUCT

(75) Inventors: Kevin Moreton, Rugby Warks (GB);
Kevin Scott, Branston (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 829 days.

(21) Appl. No.: 14/113,954

(22) PCT Filed: Apr. 11, 2012

(86) PCT No.: PCT/EP2012/056546
§ 371 (c)(1),
(2), (4) Date: Apr. 1, 2014

(87) PCT Pub. No.: WO2012/146481
PCT Pub. Date: Nov. 1, 2012

(65) Prior Publication Data
US 2014/0234073 A1    Aug. 21, 2014

(30) Foreign Application Priority Data
Apr. 28, 2011 (EP) .................... 11164130

(51) Int. Cl.
*F01D 25/14* (2006.01)
*F01D 25/12* (2006.01)
(Continued)

(52) U.S. Cl.
CPC .............. *F01D 25/14* (2013.01); *F01D 9/00* (2013.01); *F01D 25/26* (2013.01); *F02C 7/18* (2013.01);
(Continued)

(58) Field of Classification Search
CPC . F01D 9/00; F01D 25/14; F01D 25/26; F02C 7/18; F05D 2250/323;
(Continued)

(56) References Cited
U.S. PATENT DOCUMENTS 3,362,681 A * 1/1968 Smuland ................. F01D 5/187
415/115
3,427,000 A * 2/1969 Scalzo .................... F01D 9/042
415/108
(Continued)

FOREIGN PATENT DOCUMENTS

CN     1487172 A    4/2004
EP     0578639 A1   1/1994
(Continued)

*Primary Examiner* — Audrey K Bradley

(57) ABSTRACT

A turbine includes an inner casing to which at least a stator vane of a turbine section is mountable, and an outer casing arranged around the inner casing in such a way that an outer cooling channel is formed between the inner casing and the outer casing. The outer cooling channel includes a fluid inlet through which a cooling fluid is injectable from an outer volume of the turbine into the outer cooling channel. The cooling channel includes a fluid outlet such that the cooling fluid is exhausted into an inner volume of the turbine. The fluid inlet is located with respect to the fluid outlet such that the cooling fluid inside the outer cooling channel includes a flow direction which has a component that is orientated in opposite direction with respect to a main flow direction of a working fluid of the turbine.

10 Claims, 2 Drawing Sheets

(51) Int. Cl.
*F01D 25/26* (2006.01)
*F01D 9/00* (2006.01)
*F02C 7/18* (2006.01)

(52) U.S. Cl.
CPC .. *F05D 2250/323* (2013.01); *F05D 2260/205* (2013.01); *F05D 2260/221* (2013.01); *F05D 2260/2214* (2013.01); *Y02T 50/676* (2013.01)

(58) Field of Classification Search
CPC ......... F05D 2260/205; F05D 2260/221; F05D 2260/2214; Y02T 50/676
See application file for complete search history.

(56) References Cited

U.S. PATENT DOCUMENTS

| | | | |
|---|---|---|---|
| 3,689,174 A * | 9/1972 | Rahaim | F01D 5/18 415/115 |
| 4,017,207 A * | 4/1977 | Bell | F01D 11/08 415/115 |
| 4,242,042 A | 12/1980 | Schwarz | |
| 4,841,726 A | 6/1989 | Burkhardt | |
| 6,179,557 B1 * | 1/2001 | Dodd | F01D 9/00 415/108 |
| 6,227,800 B1 | 5/2001 | Spring et al. | |
| 6,625,989 B2 | 9/2003 | Boeck | |
| 6,641,363 B2 * | 11/2003 | Barrett | F01D 9/04 415/108 |
| 2004/0018081 A1 | 1/2004 | Anderson | |
| 2004/0090013 A1 * | 5/2004 | Lawer | F01D 11/08 277/412 |
| 2006/0225430 A1 | 10/2006 | Paprotna et al. | |
| 2011/0085894 A1 * | 4/2011 | Dueckershoff | F01D 9/041 415/175 |

FOREIGN PATENT DOCUMENTS

| | | |
|---|---|---|
| EP | 0618349 A1 | 10/1994 |
| EP | 0578639 B1 | 10/1995 |
| EP | 0974734 A2 | 1/2000 |
| EP | 1213444 A2 | 6/2002 |
| EP | 1890009 A2 | 2/2008 |
| EP | 2243933 A | 10/2010 |
| EP | 2243933 A1 | 10/2010 |
| GB | 2108586 B | 8/1985 |
| RU | 2159335 C1 | 11/2000 |
| RU | 2196239 C2 | 1/2003 |
| RU | 2196896 C1 | 1/2003 |

* cited by examiner

CASING COOLING DUCT

CROSS REFERENCE TO RELATED APPLICATIONS

This application is the US National Stage of International Application No. PCT/EP2012/056546, filed Apr. 11, 2012 and claims the benefit thereof. The International Application claims the benefits of European application No. 11164130.4 EP filed Apr. 28, 2011. All of the applications are incorporated by reference herein in their entirety.

FIELD OF INVENTION

The present invention relates to a turbine and to a method of operating a turbine.

ART BACKGROUND

In turbines, particularly in and around turbine sections of turbines, turbine parts, such as casings, are exposed to a hot working fluid of the turbine. Hence, cooling systems are applied for cooling the turbine parts.

For cooling purposes, cooling air systems are installed for providing a cooling air stream to the hot turbine parts. The space for installing a cooling air system and for providing effective cooling on the outside and inside of the turbine parts, such as casing parts, is limited. Furthermore, complex cooling systems are expensive and the reliability is low. Moreover, a high amount of cooling air may affect negatively the turbine performance.

EP 0 578 639 B1 discloses a turbine casing. The turbine casing is partially enclosed by a cowling so that a gap is defined between the turbine casing and the cowling for the flow of cooling air.

U.S. Pat. No. 4,841,726 discloses a gas turbine jet engine of multi-shaft double-flow construction. A front compressor or fan supplies in the gas turbine compressed air into a secondary channel which is arranged coaxially to the propulsion unit axis and which is formed between outer and inner wall structures from which a secondary air component is taken and blown out against the turbine housing structures for the purpose of cooling. The secondary air channel extends essentially over the entire propulsion unit length or at least up to the area near the turbine housing structure while the secondary air component is taken off from the secondary flow by way of openings in the inner wall structure which are arranged in direct proximity of the respective turbine housing structure.

U.S. Pat. No. 4,242,042 discloses a temperature control of an engine case for clearance control. The injection of cooling air into an annular space is defined by a double wall construction consisting of the case and an outer air seals serve to control the leakage in and out of the space and the temperatures of the engine case. The temperature range between the hot gas stream and the cool air acting on the engine case controls shrinkage and expansion of the case which in turn positions the seal relative to the tip of the rotating blades, which can be manifested as a function of engine power or other parameters.

US 2004/0018081 A1 discloses a low pressure turbine casing with a conical annular shell circumscribed about a center-line. A forward flange is positioned to a forward end of the annular shell. A forward hook extends afterwards from the forward flange. First and second rails having first and second hooks, respectively, extend afterwards from the annular shell. First and second cooling holes extend through the first and second rails, respectively. Cooling air feed holes extend through the forward flange. The first and second cooling holes are radially disposed through the first and second rails, respectively, with respect to the centerline or disposed through the first and second rails at an oblique angle with respect to the centerline. A low pressure turbine casing and a shroud assembly further includes a first annular cavity in fluid flow communication with the first cooling holes and the second cooling holes.

GB 2 108 586 discloses a clearance control between tips of turbine rotor blades and the surrounding casing. Cooling air may be directed through a line to a low pressure turbine casing.

U.S. Pat. No. 6,227,800 B1 discloses a turbine casing which supports a row of nozzle vanes through hot combustion gases may flow. A baffle surrounds the casing to define a cooling duct. A nacelle surrounds the turbine casing to define a bay having an inlet for receiving bay air, and an outlet for discharging the air. The cooling duct includes an inlet which receives the bay air for flow along the turbine casing for selective cooling thereof.

U.S. Pat. No. 6,625,989 B2 discloses a method and an apparatus for the cooling the casing of the turbines of jet engines, in which cooling air is diverted from a bypass flow and supplied to the outer side of the casing via an inlet duct provided with a shut-off element. The cooling air is supplied to a first chamber in which it is divided by volume. One portion of the cooling air is issued to the casing via orifice holes, while another portion is ducted via several tubes to a second chamber which annularly encloses the casing in the area of a low-pressure turbine.

EP 0 618 349 A1 discloses a turbine assembly for a gas turbine engine which comprises alternate annular arrays of rotor blades and stator vanes enclosed in an annular casing. Each stator vane is secured by a platform at its radially outer extent. A bolt extends through a flange on the platform to locate the stator vane relative to the casing and prevents any circumferential movement of the stator vane. The bolt extends radially through the casing to engage an annular cooling duct. The annular cooling duct encloses the casing to define a cavity through which in operation cooling air passes to cool the casing.

SUMMARY OF THE INVENTION

It is an objective of the present invention to provide an effective cooling of hot turbine parts.

This objective may be solved by a turbine, in particular a gas turbine and by a method for operating a turbine, in particular a gas turbine, according to the subject-matters of the independent claims.

According to a first aspect of the present invention, a turbine, in particular a gas turbine, is presented. The turbine comprises an inner casing to which at least a stator vane of a turbine stage, i.e. a turbine section, is mountable. Furthermore, the turbine comprises an outer casing, which is arranged around the inner casing in such a way that an outer cooling channel is formed between the inner casing and the outer casing. The outer cooling channel comprises a fluid inlet through which a cooling fluid is injectable from an outer volume of the turbine into the outer cooling channel. The cooling channel comprises a fluid outlet such that the cooling fluid is exhausted into an inner volume of the turbine. The fluid inlet is located with respect to the fluid outlet such that the cooling fluid inside the outer cooling channel comprises a flow direction which has a component that is orientated in opposite direction with respect to a main flow direction of a working fluid of the turbine.

According to a further aspect of the present invention, a method for operating a turbine, in particular a gas turbine, is presented. The turbine comprises an inner casing to which at least a stator vane of a turbine stage, i.e. a turbine section, is mountable and an outer casing, which is arranged around the inner casing in such a way that an outer cooling channel is formed between the inner casing and the outer casing. According to the method, the cooling fluid is injected through a fluid inlet of the outer cooling channel from an outer volume of the turbine into the outer cooling channel. Furthermore, the cooling fluid is exhausted through a fluid outlet of the cooling channel into an inner volume of the turbine. The fluid inlet is located with respect to the fluid outlet such that the cooling fluid inside the outer cooling channel comprises a flow direction which has a component that is orientated in opposite direction with respect to a main flow direction of a working fluid of the turbine.

The turbine may be a gas turbine, which may also comprise a combustion chamber and a compressor for example.

Generally, the turbine comprises a rotatable turbine shaft. The rotating shaft rotates around a rotary axis which defines the axial direction of the turbine. A direction which directs from the outside in direction to the rotary axis of the turbine shaft denotes the radial direction of a turbine.

The turbine comprises a variety of casing parts which have the function of supporting functional elements of the turbine and/or which are used for directing fluid streams of the turbine. In particular, the inner casing is adapted for supporting a stator vane row comprising a plurality of circumferentially attached stator vanes. Moreover, to the inner casing, a variety of fluid directing parts of the turbine, such as air deflectors may be attached. Air deflectors may take the form of screens and/or heat shields.

In particular, the inner casing separates the working fluid of the turbine from the environment. The inner casing separates in particular the inner volume of the turbine from the outer volume of the turbine. Inside the inner volume, the working fluid streams along a main fluid direction, wherein the main flow direction is in particular orientated axial with respect to the turbine shaft.

Inside the inner volume, stator vane rows and the rotor blade rows are installed. In particular, the hot pressurized gas flows inside the inner volume along the main flow direction. A secondary fluid stream or a secondary air stream (bleed air) streams inside the outer volume which surrounds the inner casing and hence the inner volume. The secondary fluid stream may be used for cooling purposes.

The outer casing as described above surrounds at least partially the inner casing. Between the inner casing and the outer casing the outer cooling channel is formed. The outer casing is formed inside the outer volume. The outer casing comprises an inlet hole and an outlet hole and/or a gap at its edges in order to provide a fluid inlet from the outer volume inside the outer cooling channel. The inner casing provides the fluid outlet by means of outlet holes or gaps at its edges in order to exhaust cooling air into the inner volume and/or inside a conduit of an inner stator vane of a stator vane row which is mounted to the inner casing.

As described above, the inner casing and the outer casing may be arranged in a turbine section of a turbine. Particularly it may be arranged in a power turbine section that is provided to drive an attached rotary equipment. Alternatively it may be arranged in a compressor turbine section which drives the compressor rotors. Inside the turbine section, the working fluid (primary fluid) expands along the main flow direction, i.e. in axial or downstream direction. The inner casing and the outer casing may have a cone-like or truncated cone-like/frusto-cone-like shape, wherein the diameter and the size of the inner casing and the outer casing increase along the main flow direction and the axial direction, respectively. Moreover, the inner casing and/or the outer casing forms an annular duct or gap in circumferential direction around the turbine shaft. The inner casing and/or the outer casing may extend along the complete circumference of the turbine stage/section or may be separated along a circumferential direction into several circumferential segments.

By the above-described turbine, the outer cooling channel is formed by the inner casing and the outer casing in such a way, that the flow direction of the cooling fluid inside the outer cooling channel flows partially upstream with respect to the main flow direction of the working fluid inside the inner casing. In particular, the cooling fluid flows inside the outer volume in a radial direction and along a parallel and reverse direction with respect to the main flow direction. By the outer cooling channel, the cooling fluid is redirected from the downstream (in relation to the hot gas flow) flow direction inside the outer volume with respect to the main flow direction to an upstream (in relation to the hot gas flow) flow direction inside the cooling channel. Further, when exhausting the cooling fluid into the inner volume or into the conduit of the stator vane the cooling fluid is redirected again to a downstream direction substantially perpendicular to the main flow direction of the working fluid inside the inner volume of the turbine. Hence, before injecting the cooling fluid into the inner volume, the cooling fluid is at least twice times redirected by the flow through the cooling channel.

This has the technical effect that the cooling air which flows into the outer cooling channel flows in thermal contact along a radially outer surface of the inner casing, which forms a part of the outer cooling channel. The cooling fluid may pass furthermore a radially inner surface of the inner casing, which inner surface faces the inner volume. Hence, because the cooling air flows upstream (relative to the hot gas flow) along the radially outer surface of the inner casing, the cooling air may be additionally used for cooling additionally further parts, such as a stator vane or the radially inner surface of the inner casing, because the cooling air leaves the outer cooling channel at a upstream position and thus enters the inner volume at an upstream position. After entering the inner volume, the cooling air is affected by the working fluid inside the inner volume. For example, when guiding the cooling air in the outer cooling duct firstly along an upstream direction, the cooling fluid may cool both surfaces of the inner casing after being redirect into a downstream direction in the inner volume. Hence, because the cooling air passes large surface areas (in particular the inner surface and the outer surface) of the inner casing a good thermal convection and thus a good cooling efficiency may be provided. Furthermore, the pressure in the inner volume of the gas turbine is decreasing in the main flow direction, resulting in higher pressure differences between the cooling air flow and the hot gas giving a higher consumption of cooling air if not initially, when outside the casing, first being flown in the opposite direction to the main hot gas flow. The counter flow arrangement between the cooling air and the hot gas flow ensures a high cooling efficiency for a given available surface area transferring heat from the component to the cooling air.

Moreover, because the cooling efficiency is improved by the present invention, the consumption of the cooling fluid (i.e. the secondary fluid/air) may be reduced. Moreover, the higher cooling efficiency permits additionally to form the inner casing out of material which may only be applicable at lower temperatures. In particular, the temperature of the inner casing may be reduced during operation of the turbine to below approximately 450° C. such that it may not be necessary to use expensive nickel casings. If an inner casing temperature of lower than approximately 450° C. is achieved, e.g. by applying the present invention, the inner casing may be made from cheaper steel, for example. Moreover, the reduced operating temperature of the inner casing may additionally improve the efficiency of the turbine e.g. by reducing tip clearances, by reducing air consumption, by applying a simple duct construction and by using cheaper casing material.

According to a further exemplary embodiment of the present invention, the fluid inlet is formed in the outer casing. The fluid inlet may be formed for example by inlet holes formed into the outer casing.

According to a further exemplary embodiment, the fluid outlet is formed in the inner casing, for example by inlet holes or inlet channels formed into the inner casing.

According to a further exemplary embodiment, the outer channel is formed with a converging shape for accelerating the cooling fluid inside the outer channel.

By forming the outer cooling duct by surrounding the inner casing, a variation in the radial distance or radial height of the cooling channel is achieved and the characteristics of the cooling fluid flow (especially for increasing velocity) may be controlled. Hence, the outer cooling duct shape may be adapted and used to control the rate of flow, speed, direction, mass, distribution, and/or the pressure of the cooling fluid.

In particular, if the inner casing and the outer casing have a cone-like shape along the axial direction of the turbine, the cone angle of both casings may differ such that the diameter and the size of the cross section (hydraulic diameter) of the cooling channel varies along an axial direction. In particular, the cross section of the cooling channel is reduced along an axial upstream direction. In particular, the hydraulic diameter (cross sectional area) of the cooling channel at the fluid inlet, are larger than the hydraulic diameter (cross sectional area) at the fluid outlet. Hence, a converging shape for accelerating the cooling fluid inside the outer cooling channel may be formed.

By accelerating the cooling fluid by the outer cooling channel, the cooling fluid has at the fluid inlet a lower velocity than at the fluid outlet. The cooling fluid heats up along the flow direction between the fluid inlet and the fluid outlet. Hence, by providing an accelerated cooling fluid by the converging shape of the outer cooling channel, the cooling efficiency of the turbine may be improved.

According to a further exemplary embodiment, the turbine further comprises a first stator vane row which comprises at least one first stator vane, wherein the first stator vane row is mounted to a first portion of the inner casing. The turbine further comprises a second stator vane row which comprises at least one second stator vane, wherein the second stator vane row is mounted to a second portion of the inner casing. With regard to the main flow direction, the second portion is located downstream with respect to the first portion.

The cooling channel and the outer casing may only be present on a portion of the inner casing such that the outer casing does not completely cover the inner casing. Exemplary embodiments are described in the following. For example, the first stator vane row and the second stator vane row are stator vane rows which are located in a middle section of a turbine section such that further stator vane rows of the turbine section are located upstream and/or downstream of the first stator vane row and the second stator vane row. Hence, the outer cooling channel is formed by the outer casing along the middle section and does not cover the inner casing along the complete axial length of the turbine section. Moreover, the turbine section may comprise at least one further stator vane row between the first stator row and the second stator row. Hence, the outer cooling channel is formed by the outer casing along the group of stator vanes comprising the first stator vane row, the interposed further stator vane row(s) and the second stator vane row.

According to a further exemplary embodiment, the first stator vane row comprises a further first stator vane, wherein the first stator vane and the further first stator vane are arranged with respect to each other along a circumferential direction of the turbine. The outer casing is arranged around the inner casing in such a way that the outer cooling channel extends at least between the first stator vane and the further first stator vane.

In most situations the outer casing would cover the full circumference of the inner casing. Installing local lumps of mass as a dividing flange along the main flow direction of the casing to partition off sectors may introduce local deformations leading to ovalities and hence increased tip clearance resulting in loss of performance.

According to a further exemplary embodiment, the second stator vane row comprises a further second stator vane, wherein the second stator vane and the further second stator vane are arranged with respect to each other along a circumferential direction of the turbine. The outer casing is arranged around the inner casing in such a way that the outer cooling channel extends at least between the second stator vane and the further second stator vane.

According to a further exemplary embodiment, the at least one first stator vane comprises a conduit, wherein the first stator vane is mounted to the inner casing in such a way that the cooling fluid is flowable from the fluid outlet into the conduit. The second stator vanes may comprise further conduits through which cooling air is flowable as well.

In circumferential direction around the turbine shaft, a plurality of first stator vanes having conduits are mountable, wherein each first stator vane conduit is connected to the outer cooling channel, such that the cooling fluid is fully or at least partially flowable from the fluid outlet inside each of the plurality of first stator vanes.

In particular, by the above-described exemplary embodiment, the first stator vane row may be a first stator vane row of a power turbine section, where the working fluid enters the turbine stage. The second stator vane row may be a downstream located last stator vane row, where the working fluid exits the turbine section. By the above described exemplary embodiment it is outlined, that the cooling channel may extend along the whole surface area of the inner casing in axial direction or circumferential direction. Hence, the cooling fluid is adapted for cooling the complete surface area of the inner casing e.g. of a turbine section when flowing through the outer cooling channel.

The cooling air may enter a stator vane conduit downstream of the first stator vane of the turbine and/or the cooling air enters the outer cooling channel at an upstream location of the turbine section exit.

According to a further exemplary embodiment, the turbine further comprises an inner cooling channel which is formed between a first radial outer end of the first stator vane(s), a second radial outer end of the second stator vane(s) and a radial inner surface of the inner casing. The inner cooling channel is connected to the fluid outlet in such a way that a portion of the cooling fluid flows through the inner cooling channel, wherein the portion of the cooling fluid comprises a flow direction which has a component that is orientated parallel to the main flow direction of the working fluid of the turbine.

Hence, by the above described exemplary embodiments, an inner channel is formed which runs along the inner surface of the inner casing basically in axial direction of the turbine. Hence, the cooling fluid that flows through the outer cooling channel along the outer surface of the inner casing may be redirected when being exhausted from the outer cooling channel to the inner volume and may flow along the inner surface of the inner casing substantially along the downstream direction. In particular, a part of the cooling fluid comprises a component that is orientated parallel to the main flow direction of the working fluid of the turbine, cooling the rotor.

Hence, the inner casing may be in thermal connection with both surfaces, namely the inner surface and the outer surface, with the cooling fluid, such that the cooling efficiency of the inner casing is improved.

According to a further exemplary embodiment, the turbine further comprises a first cavity which is formed at a first radial inner end of the at least one first stator vane. Moreover, the turbine comprises a second cavity which is formed at a second radial inner end of the second stator vane(s). The first stator vane comprises an opening at the first radial inner end such that the cooling fluid is flowable from the conduit of the first stator vane into the first cavity. The first cavity and the second cavity are connected between each other in such a way that the cooling fluid is flowable from the first cavity to the second cavity. Hence, by the above-described exemplary embodiments, an effective flow path for the cooling fluid is provided, such that parts of the turbine may be cooled by the cooling fluid efficiently.

According to a further exemplary embodiment, the turbine further comprises a plurality of further stator vane rows which are located between the first stator vane row and the last second stator vane row. Each first stator vane row comprises a plurality of first vanes that are located one after another along a circumferential direction. The stator vanes of a stator row may be mounted to one common fixed-vane carrier. Hence, in particular three, four, five or more rows of stator vanes may be interposed along the axial direction between the first stator vane row and the second stator vane row. The cooling channel extends along all stator vane rows in axial direction or may only partially extend between predetermined stator rows. Hence, further installations for providing further outer cooling channels may not be necessary due to the elongation of the outer cooling channel along the complete turbine stage.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
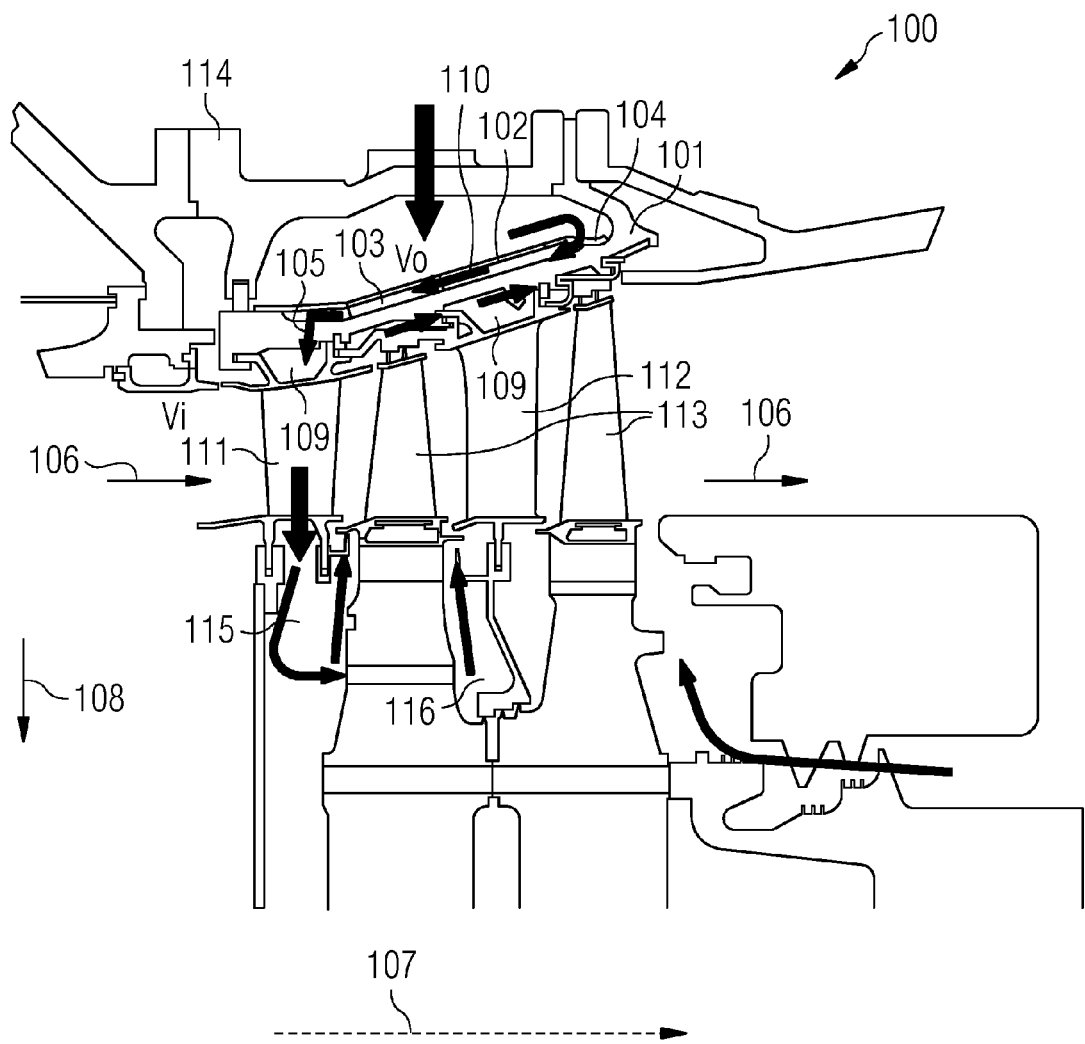
FIG. 1 shows a turbine according to an exemplary embodiment of the present invention.

The illustrations in the drawings are schematical. It is noted that in different figures, similar or identical elements are provided with the same reference signs.

FIG. 1 shows a turbine 100, in particular a gas turbine. The turbine 100 comprises an inner casing 101 to which at least a stator vane of a turbine stage is mounted. Furthermore, the turbine 100 comprises an outer casing 102 which is arranged around the inner casing 101 in such a way that an outer cooling channel 103 is formed between the inner casing 101 and the outer casing 102. The outer cooling channel 103 comprises a fluid inlet 104 through which a cooling fluid is injectable from an outer volume Vo of the turbine 100 into the outer cooling channel 103. The cooling channel 103 comprises a fluid outlet 105 such that the cooling fluid is exhausted into an inner volume Vi of the turbine 100. The fluid inlet 104 is located with respect to the fluid outlet 105 such that the cooling fluid inside the outer cooling channel 103 comprises a flow direction 110 which has a component that is orientated in opposite direction with respect to a main flow direction 106 of a working fluid of the turbine 100.

In FIG. 1, the axial direction 107 is indicated, which describes in particular the direction of a rotating axis of a turbine shaft (not shown). Perpendicular to the axial direction 107 the radial direction 108 is indicated that describes a direction that runs through the center point of the turbine shaft, for example.

Inside the outer portion of inner volume Vi the working fluid flows along the main flow direction 106. When flowing through the outer portion of the inner volume Vi, the working fluid passes first and second stator vane rows 111, 112. A plurality of first stator vanes of the first stator vane row 111 may be located along a circumferential direction around the turbine shaft. A plurality of second stator vanes of the second stator vane row 112 may be located along a circumferential direction around the turbine shaft. Between the respective stator vane rows 111, 112, rotor blade rows 113, which are mounted to and around the turbine shaft, are interposed. The working fluid which flows through the outer portion of the inner volume expands along the main flow direction 106 and powers the rotor blade rows 113. In general, the working fluid is a hot gas or steam which heats up the vane and blade rows 111-113 and the inner casing 101. Hence, the inner casing 101 as well as the turbine parts inside the inner volume Vi have to be cooled by the cooling fluid.

The cooling fluid is for example bleed air. The cooling fluid may be first of all injected into the outer volume Vo of the turbine 100. The outer volume Vo may be a cavity that is formed by a further outer casing 114 and the inner casing 101. The outer volume Vo may be formed by a duct that is formed by the outer casing 102 and the further outer casing 114, wherein the duct runs along the axial direction 107 and at least partially surrounds in circumferential direction the turbine stage.

The outer volume Vo may take a toroid shape along the circumferential direction, near or more precisely over the fluid inlet 104. This is particularly a preferable arrangement when the further outer casing 114 is not present in the design.

The cooling fluid flows from the outer volume Vo to the fluid inlet 104 inside the outer cooling channel 103. The outer cooling channel 103 is surrounded by the outer surface of the inner casing 103 and the inner surface of the outer casing 102. In an exemplary embodiment, the outer cooling channel 103 may have a converging shape in at least a section along the length of the cooling channel 103, such that the cooling fluid inside the outer cooling channel 103 is accelerated.

Furthermore, the outer cooling channel 103 comprises a fluid outlet 105 through which the cooling fluid may exhaust from the outer cooling channel 103 into the inner volume Vi and in particular into a first stator vane having a conduit or inside an inner cooling channel 109. The outer cooling channel 103 may extend along the surface area of the inner casing 101 which runs between the first hollow stator vane row 111 and the second stator vane row 112. Moreover, the outer cooling channel 103 may extend along the circumference of the outer surface of the inner casing 101. Hence, the cooling fluid inside the outer cooling channel 103 flows along a major part of the outer surface of the inner casing 101 so that a good thermal convection and hence a high cooling efficiency for the inner casing 101 may be achieved.

In particular, the fluid inlet 104 and the fluid outlet 105 are arranged in such a way, that the cooling fluid inside the cooling channel 103 flows at least with a component along an opposite direction with respect to the main flow direction 106 of the working fluid inside the inner volume Vi.

Moreover, the fluid flow of the cooling fluid inside the inner cooling channel 109 is directed at least partially in direction to the main flow direction 106. Hence, the outer surface of the inner casing 101 and the inner surface of the inner casing 101 are surrounded by the cooling fluid such that the cooling efficiency is increased.

In particular, the inner cooling channel 109 is formed between a first radial outer end of the first stator vane row 111, a second radial outer end of the second stator vane row 112 and the (radial) inner surface of the inner casing 101.

The cooling fluid which flows through the conduit of a first stator vane is further exhausted into a first cavity 115 which is located in the inner portion of the inner volume Vi at a radial inner end of the first stator vane. From the inner cavity 115, the cooling fluid may flow inside the inner portion of inner volume Vi of the turbine 100 or may flow through a gap or conduit for passing the interposed rotor blade row 113 into a second cavity 116 which is located at a radial inner end of a second stator vane of the second stator vane row 112 which is located downstream of the hollow first stator vane row 111. From the second cavity 116, the cooling fluid may further flow inside the inner portion of inner volume Vi before being discharged to the outer portion of the inner volume Vi or may flow inside a conduit of a second stator vane of the second stator vane row 112. Hence, an effective cooling path for the cooling fluid is formed.

Figure 2:
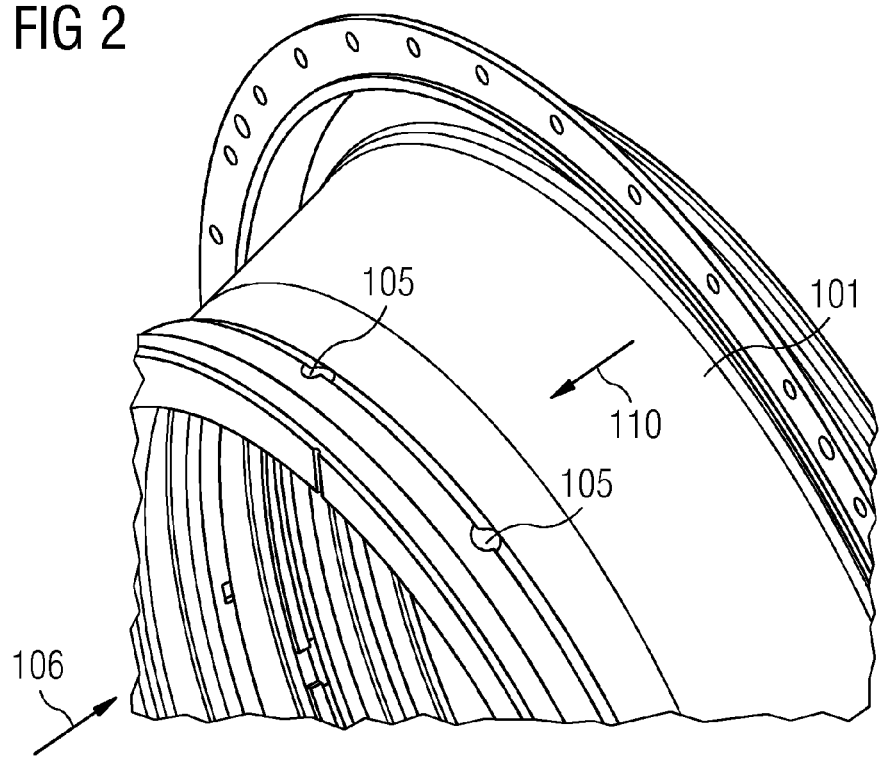
FIG. 2 shows an inner casing according to an exemplary embodiment of the present invention.

FIG. 2 shows a perspective view of the inner casing 101. For a better orientation, the main flow direction 106 is shown. Moreover, along the radially outer surface of the inner casing 101 the flow direction 110 of the cooling fluid inside the outer cooling channel 103 is shown. At an upstream location or edge of the inner casing 101 with respect to the main flow direction 106, holes which form the fluid outlet 105 are shown. Through the holes of the fluid outlet 105, the cooling fluid may be injected inside the inner volume Vi of the turbine 100.

In FIG. 2 it is shown, that the inner casing 101 forms a conical shape wherein the cross-section increases along the main flow direction 106. The inner casing 101 may run along the circumference of a turbine section of the turbine 100 or may be separated along the circumferential direction of the turbine 100 in several parts that may be fitted together. By the effective cooling according to the present invention, the inner casing 100 may be cooled down to a temperature range around 400-450° C. in operation of the turbine, such that expensive nickel casings may be prevented and cost-efficient steel casings as inner casings 101 may be used.

Figure 3:
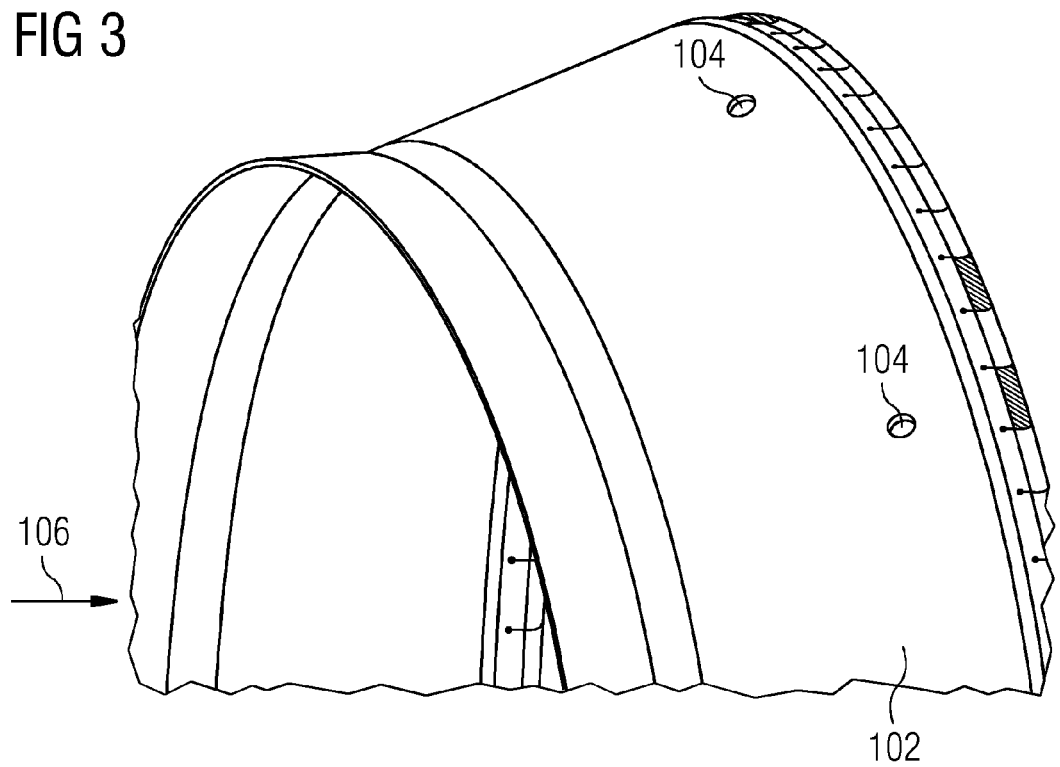
FIG. 3 shows an outer casing of a turbine according to an exemplary embodiment of the present invention.

FIG. 3 shows a perspective view of an outer casing 102 according to the present invention. For a better orientation the main flow direction 106 is shown. The outer casing 102 may be mounted over the inner casing 101. The outer casing 102 comprises a conical shape, wherein the diameter of the outer casing 102 increases along the main flow direction 106. If the inner casing 101 and the outer casing 102 comprise different cone angles, varying sizes of the cross-sections of the outer cooling channel 103 along the main flow direction 106 may form a converging shape for accelerating the cooling fluid inside the outer cooling channel 103.

As shown in FIG. 3, the outer casing 102 comprises holes which form the fluid inlet 104. As shown in FIG. 3, the holes forming the fluid inlet 104 are formed at a downstream position or edge with respect to the holes that forms the fluid outlet 105 in the inner casing 101. Hence, the cooling fluid that is injected through the holes forming the fluid inlet 104 of the outer casing 102 streams in an upstream direction with respect to the main flow direction 106 and exits the outer cooling channel 103 through the holes forming the fluid outlet 105 of the inner casing 101.

The outer casing 102 may run along the circumference of the turbine 100. Moreover, the outer casing 102 may be separated in annular segments which form together the annular outer casing 102.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:
1. A turbine, comprising:
an inner casing, and
an outer casing, which is arranged around the inner casing in such a way that an outer cooling channel is formed between the inner casing and the outer casing,
wherein the outer cooling channel comprises a fluid inlet through which a cooling fluid is injectable from an outer volume of the turbine into the outer cooling channel, wherein the outer cooling channel comprises a fluid outlet such that the cooling fluid is exhausted into an inner volume of the turbine, wherein the fluid inlet is located with respect to the fluid outlet such that the cooling fluid inside the outer cooling channel comprises a flow direction which has a component that is orientated in opposite direction with respect to a main flow direction of a working fluid of the turbine, a first stator vane row which comprises at least one first stator vane, wherein the first stator vane row is mounted to a first portion of the inner casing, wherein the at least one first stator vane comprises a conduit, wherein the at least one first stator vane is mounted to the inner casing in such a way that the cooling fluid is flowable from the fluid outlet into the conduit, a second stator vane row which comprises at least one second stator vane, wherein the second stator vane row is mounted to a second portion of the inner casing, wherein, with regard to the main flow direction, the second portion is located downstream with respect to the first portion, a first cavity which is formed at a first radial inner end of the at least one first stator vane, and a second cavity which is formed at a second radial inner end of the at least one second stator vane, wherein the at least one first stator vane comprises an opening at the first radial inner end such that the cooling fluid is flowable from the conduit of the at least one first stator vane into the first cavity, wherein the first cavity and the second cavity are connected between each other in such a way that the cooling fluid is flowable from the first cavity to the second cavity.

2. The turbine according to claim 1, wherein the fluid inlet is formed in the outer casing.

3. The turbine according to claim 1, wherein the fluid outlet is formed in the inner casing.

4. The turbine according to claim 1, wherein the outer cooling channel is formed with a converging shape in an axial direction for accelerating the cooling fluid inside the outer cooling channel.

5. The turbine according to claim 1, wherein the outer casing is arranged around the inner casing in such a way that the outer cooling channel extends at least between the first portion of the inner casing and the second portion of the inner casing.

6. The turbine according claim 1, wherein the second stator vane row comprises a further second stator vane, wherein the at least one second stator vane and the further second stator vane are arranged with respect to each other along a circumferential direction of the turbine, wherein the outer casing is arranged around the inner casing in such a way that the outer cooling channel extends at least between the at least one second stator vane and the further second stator vane.

7. The turbine according to claim 1, further comprising:

an inner cooling channel which is formed between a first radial outer end of the at least one first stator vane, a second radial outer end of the at least one second stator vane and a radial inner surface of the inner casing, wherein the inner cooling channel is connected to the fluid outlet in such a way that a portion of the cooling fluid flows through the inner cooling channel, wherein the portion of the cooling fluid comprises a flow direction which has a component that is orientated parallel to the main flow direction of the working fluid of the turbine.

8. The turbine according to claim 1, wherein the turbine is a gas turbine.

9. A method for operating a turbine, wherein the turbine comprises an inner casing and an outer casing, which is arranged around the inner casing in such a way that an outer cooling channel is formed between the inner casing and the outer casing, at least one first stator vane comprising an opening at a first radial inner end and a conduit, wherein the at least one first stator vane is mounted to the inner casing, a first cavity which is formed at the first radial inner end of the at least one first stator vane, at least one second stator vane, and a second cavity formed at a second radial inner end of the second stator vane, wherein the first cavity and the second cavity are connected between each other, the method comprising:

injecting a cooling fluid through a fluid inlet of the outer cooling channel from an outer volume of the turbine into the outer cooling channel, exhausting the cooling fluid through a fluid outlet of the outer cooling channel into an inner volume of the turbine, wherein the fluid inlet is located with respect to the fluid outlet such that the cooling fluid inside the outer cooling channel comprises a flow direction which has a component that is orientated in opposite direction with respect to a main flow direction of a working fluid of the turbine, flowing the cooling fluid from the fluid outlet into the conduit, flowing the cooling fluid from the conduit of the at least one first stator vane into the first cavity, and flowing the cooling fluid from the first cavity to the second cavity.

10. The method according to claim 9, wherein the turbine is a gas turbine.

* * * * *